(12) United States Patent
Yamabe (10) Patent No.: US 7,965,060 B2
(45) Date of Patent: Jun. 21, 2011

(54) APPARATUS FOR EQUALIZING CAPACITY OF SECONDARY BATTERY, AND DISCHARGE CONTROLLER

(75) Inventor: Norito Yamabe, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 761 days.

(21) Appl. No.: 11/969,820

(22) Filed: Jan. 4, 2008

(65) Prior Publication Data
US 2008/0169789 A1 Jul. 17, 2008

(30) Foreign Application Priority Data
Jan. 17, 2007 (JP) ................. 2007-007843

(51) Int. Cl.
*H02J 7/00* (2006.01)
*H02J 7/06* (2006.01)
*G01N 27/416* (2006.01)
(52) U.S. Cl. ........ 320/136; 320/132; 320/135; 320/164; 324/433
(58) Field of Classification Search .................. 320/132, 320/152, 135, 136, 150, 164; 324/433
See application file for complete search history.

(56) References Cited

U.S. PATENT DOCUMENTS

| | | | |
|---|---|---|---|
| 7,180,267 B2 * | 2/2007 | Nakada .................. | 320/132 |
| 2004/0135546 A1 * | 7/2004 | Chertok et al. ........... | 320/118 |
| 2005/0269990 A1 | 12/2005 | Yudahira | |
| 2008/0048617 A1 * | 2/2008 | Yoshida .................. | 320/132 |

FOREIGN PATENT DOCUMENTS

| | | | |
|---|---|---|---|
| JP | 2001-309570 A | | 11/2001 |
| JP | 2002-374633 | * | 12/2002 |
| JP | 2002-374633 A | | 12/2002 |
| JP | 2003-257501 A | | 9/2003 |
| JP | 2005151683 A | | 6/2005 |
| JP | 2005-265642 A | | 9/2005 |
| JP | 2005328642 A | | 11/2005 |
| JP | 2005333717 A | | 12/2005 |

OTHER PUBLICATIONS

Notice of Grounds for Rejection (JP) mailed Jul. 6, 2010, issued in corresponding Japanese Application No. 2007-007843, filed Jan. 17, 2007 (4 pages).

* cited by examiner

*Primary Examiner* — Richard V Muralidar
(74) *Attorney, Agent, or Firm* — Christensen O'Connor Johnson Kindness PLLC (57) ABSTRACT

A device for appropriately controlling capacitive variations between battery blocks. A voltage measurement section periodically measures a terminal voltage of each battery block by way of respective potential detection lines electrically connected to both terminals of the respective battery blocks. A discharge section effects electric discharge of each battery block by electrically connecting both terminals of a discharge element to both terminals of the respective battery blocks by way of the potential detection line. A discharge control section periodically computes an amount of variations in electromotive force of the battery blocks in accordance with respective terminal voltages measured by the voltage measurement section in parallel with measurement of the respective terminal voltages performed by the voltage measurement section, and commands the discharge section to effect electric discharge of a battery block exhibiting highest electromotive force when the amount of variations exceeds a first reference amount. Further, when the voltage measurement section measures a terminal voltage of the battery block being electrically discharged by the discharge section, the discharge control section commands the discharge section to stop electric discharge of the battery block being electrically discharged before the measurement is performed.

3 Claims, 7 Drawing Sheets

| BLOCK TO BE MEASURED | DURING CHARGING OF CAPACITOR | | DURING MEASUREMENT | |
|---|---|---|---|---|
| B1 | SWa1 | SWa2 | SWx | SWy |
| B2 | SWa3 | SWa2 | SWx | SWy |
| B3 | SWa3 | SWa4 | SWx | SWy |
| B4 | SWa5 | SWa4 | SWx | SWy |
| B5 | SWa5 | SWa6 | SWx | SWy |
| B6 | SWa7 | SWa6 | SWx | SWy |
| ⋮ | ⋮ | ⋮ | ⋮ | ⋮ |
| B2n-1 | SWa2n-1 | SWa2n | SWx | SWy |
| B2n | SWa2n+1 | SWa2n | SWx | SWy |

|  |  | BATTERY TEMPERATURE Tb | | | | | | | | | |
|---|---|---|---|---|---|---|---|---|---|---|---|
|  |  | T1 | T2 | T3 | T4 | T5 | T6 | T7 | T8 | T9 | T10 |
| ELECTROMOTIVE FORCE Eb | V1 | F10 | F20 | F30 | F40 | F50 | F60 | F70 | F80 | F90 | F100 |
| | V2 | F11 | F21 | F31 | F41 | F51 | F61 | F71 | F81 | F91 | F101 |
| | V3 | F12 | F22 | F32 | F42 | F52 | F62 | F72 | F82 | F92 | F102 |
| | V4 | F13 | F23 | F33 | F43 | F53 | F63 | F73 | F83 | F93 | F103 |
| | V5 | F14 | F24 | F34 | F44 | F54 | F64 | F74 | F84 | F94 | F104 |
| | V6 | F15 | F25 | F35 | F45 | F55 | F65 | F75 | F85 | F95 | F105 |
| | V7 | F16 | F26 | F36 | F46 | F56 | F66 | F76 | F86 | F96 | F106 |
| | V8 | F17 | F27 | F37 | F47 | F57 | F67 | F77 | F87 | F97 | F107 |
| | V9 | F18 | F28 | F38 | F48 | F58 | F68 | F78 | F88 | F98 | F108 |

Fig. 7

APPARATUS FOR EQUALIZING CAPACITY OF SECONDARY BATTERY, AND DISCHARGE CONTROLLER

PRIORITY INFORMATION

This application claims priority to Japanese Patent Application No. 2007-007843 filed on Jan. 17, 2007, which is incorporated herein by reference in its entirety.

BACKGROUND OF THE INVENTION

1. Technical Field

The present invention relates to an apparatus for controlling electric discharge of battery blocks constituting a secondary battery, as well as to a capacitance equalization apparatus for preventing occurrence of capacitive variations between battery blocks.

2. Related Art

An electric vehicle which acquires vehicle drive force by means of an electric motor, such as a pure electric vehicle or a hybrid electric vehicle, is equipped with a secondary battery, and the electric motor is driven by means of electric power stored in the secondary battery. Such an electric vehicle has a regenerative braking function; namely, a function of causing the electric motor to act as a generator during braking of the vehicle and converting kinetic energy of the vehicle into electric energy, thereby applying a brake. The thus-converted electric energy is stored in a secondary battery and reused when acceleration is performed, and the like.

Since battery performance of the secondary battery is deteriorated when the secondary battery is excessively discharged or charged, the state of charge (SOC) of the secondary battery must be grasped, to thus adjust discharging and charging operation.

Incidentally, variations occasionally arise in battery blocks in terms of battery performance depending on manufacturing processes or subsequent service conditions of the secondary battery, which in turn induces variations in the charging state of battery blocks constituting the secondary battery. In the secondary battery built by series connection of such battery blocks, when discharging and charging of the battery blocks are repeated, battery blocks having small capacitance will become excessively discharged, or battery blocks having large capacitance will become excessively charged, whereupon variations in the state of charge of battery blocks increase. Consequently, the range of capacitance within which the battery blocks can be used becomes narrower. Specifically, the life of the secondary battery decreases apparently. It is important to reduce and equalize the capacitive variations between the battery blocks constituting the secondary battery.

2005-328642 A describes a technique for charging, through a capacitance equalization sequence, battery blocks of low voltages with electric charges stored in capacitive means when the voltage of the battery blocks is measured by means of a voltage measurement sequence, thereby reducing capacitive variations between battery blocks.

2005-333717 A describes a technique for reducing capacitive variations between battery blocks by means of connecting discharge devices to respective battery blocks, measuring voltages of the respective battery blocks with voltage measurement circuits, and activating the discharge device of the battery block of high voltage, to thus cause the battery block to perform electric discharge.

2005-151683 A describes a technique for reducing charging of a battery at least when the voltage of the battery has come to a predetermined level or more, thereby uniformly charging the battery.

By the way, in a conceivable system, a discharge device and a voltage measurement device are connected in parallel to both terminals of each battery block, and a battery block which is an object of electric discharge is located in accordance with terminal voltages of the respective battery blocks measured by the voltage measurement device. The located battery block is subjected to electric discharge by means of the discharge device, thereby preventing capacitive variations in battery blocks. In such a system, for instance, when the voltage measurement device measures a terminal voltage at a predetermined measurement period while at least one battery block is taken as a unit and when the discharge device is activated concurrently, there is a potential of one battery block being simultaneously subjected to voltage measurement and electric discharge. In this case, the voltage measurement device and the discharge device are connected in parallel, and hence the voltage measured by the voltage measurement device is divided by the discharge device. Specifically, an error arises in the terminal voltage of the battery block measured by the voltage measurement device according to the case where the discharge device is not performing electric discharge and where the discharge device is performing electric discharge. Accordingly, in such a system, when capacitive variations between battery blocks are controlled in accordance with the terminal voltage of the battery block measured by the voltage measurement device, it may arise the case where capacitive variations between battery blocks cannot be reduced according to the operating state of the discharge device.

SUMMARY

The present invention provides a device capable of appropriately controlling capacitive variations in battery blocks even when electric discharge of a battery block and measurement of a voltage of the battery block are performed simultaneously.

The present invention provides a device for equalizing capacity of a secondary battery comprising:

a voltage measurement section for periodically measuring a terminal voltage of each battery block by way of potential detection lines electrically connected to both terminals of the respective battery blocks constituting the secondary battery, a discharge section for effecting electric discharge in each of the battery blocks by electrically connecting both terminals of a discharge element to both terminals of the respective battery blocks by way of the respective potential detection lines, and a discharge control section which, in parallel with measurement of the respective terminal voltages performed by the voltage measurement section, periodically computes an amount of variations in electromotive force of battery blocks in accordance with respective terminal voltages measured by the voltage measurement section; which commands the discharge section to effect electric discharge of at least a battery block exhibiting highest electromotive force when the amount of variations exceed a first reference amount; and which commands the discharge section to stop electric discharge of the battery block being electrically discharged before measurement is performed when the voltage measurement section measures a terminal voltage of the battery block being electrically discharged by the discharge section.

Further, the present invention provides a device for equalizing capacity of a secondary battery comprising:

a voltage measurement section for measuring a terminal voltage of each of battery blocks constituting a secondary battery;

a discharge section for effecting electric discharge in each of the battery blocks; and a discharge control section which allows measurement of a terminal voltage by interrupting electric discharge of the battery block whose terminal voltage is to be measured when the voltage measurement section measures a terminal voltage on a per-battery-block basis and when the battery block whose terminal voltage is to be measured is electrically discharged by the discharge section, and which resumes electric discharge of the battery block after measurement of the terminal voltage.

The present invention also provides a device for controlling electric discharge of a secondary battery comprising:

a voltage measurement section for measuring a terminal voltage of each of battery blocks constituting a secondary battery;

a discharge section for effecting electric discharge in each of the battery blocks; and a discharge control section which interrupts electric discharge of the battery block prior to measurement of the terminal voltage when the voltage measurement section measures a terminal voltage of the battery block being electrically discharged by the discharge section, and resumes electric discharge of the battery block after measurement of the terminal voltage.

According to the present invention, even when electric discharge of the battery block and measurement of a voltage of the battery block are performed in parallel with each other, control is performed in such a way that electric discharge of the battery block being subjected to voltage measurement is not performed. Therefore, measurement of a voltage of the battery block can be performed more accurately, and capacitive variations in the battery blocks can be controlled more appropriately.

The invention will be more clearly comprehended by reference to the embodiment provided below. However, the embodiment provided below is merely illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

Figure 1:
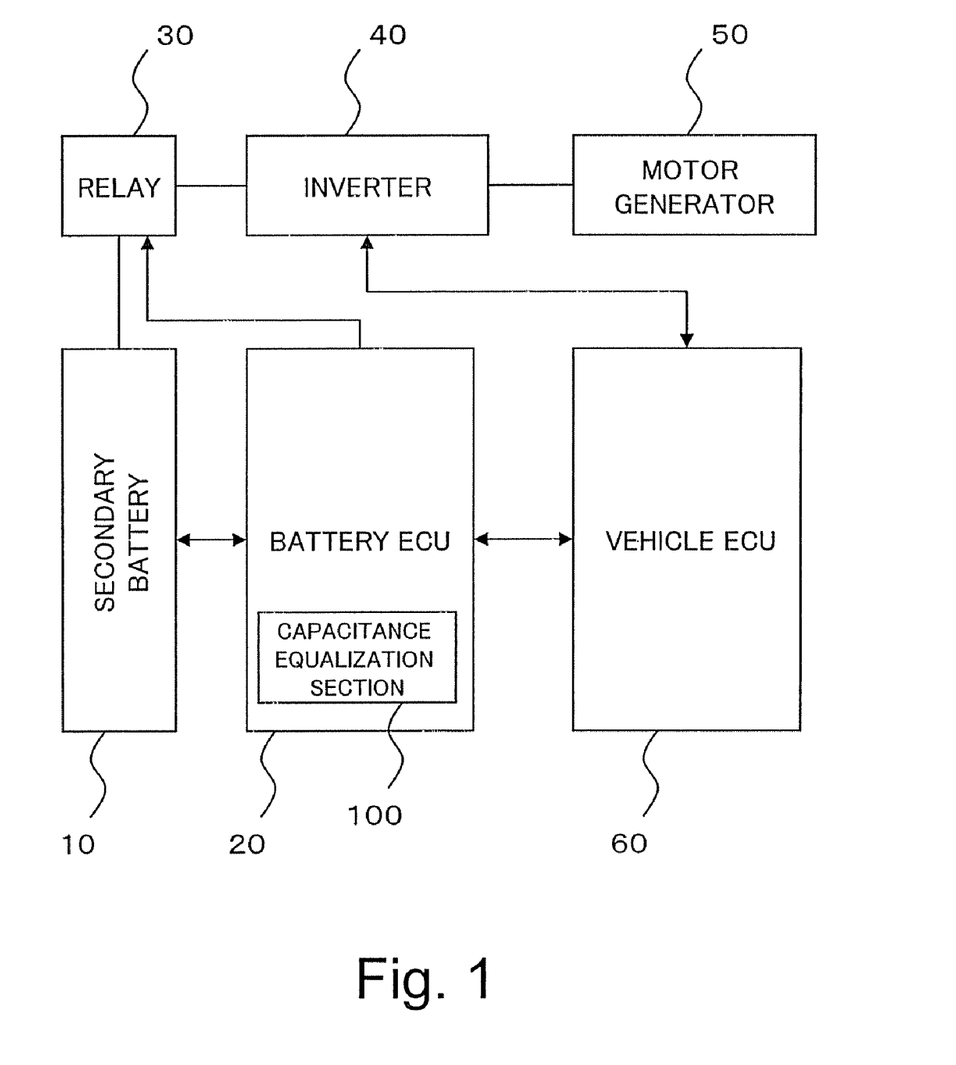
FIG. 1 is a view showing the general configuration of an electric vehicle.

FIG. 1 is a view showing the general configuration of a pure electric vehicle (PEV) equipped with a secondary battery which supplies electric power to a drive source. In an embodiment, an explanation is given by reference to the pure electric vehicle (PEV). However, the present invention can also be applied to an electric vehicle, such as a hybrid electric vehicle (HEV) having an engine and a secondary battery, a hybrid vehicle having a fuel battery and a secondary battery, and the like, so long as the present invention is a system which equalizes the capacitance of battery blocks constituting the secondary battery.

The electric vehicle has a secondary battery 10, a battery electronic control unit (hereinafter referred to as a "battery ECU") 20, a relay 30, an inverter 40, a motor generator 50, and a vehicle electronic control unit (hereinafter referred to as a "vehicle ECU") 60.

The electric ECU 20 has therein a capacitance equalization section 100 (a capacitance equalizer), and equalizes the capacitance of respective battery blocks constituting the secondary battery 10. The battery ECU 20 computes a state of charge (hereinafter abbreviated as "SOC") of the secondary battery 10 in accordance with information, such as a battery voltage V, a charge/discharge current I, and a battery temperature T. The battery ECU 20 transmits to the vehicle ECU 60 battery information about the secondary battery 10, such as an SOC or a battery temperature. Moreover, the battery ECU 20 controls opening and closing of a switching element, such as the relay 30, in accordance with the battery voltage V. The vehicle ECU 60 controls charge and discharge of the secondary battery 10 by means of controlling the inverter 40 in accordance with various types of pieces of battery information.

Under control of the battery ECU 20 and the vehicle ECU 60, the thus-configured electric vehicle converts d.c. power from the secondary battery 10 into a.c. power by way of the inverter 40, thereby driving the motor generator 50 to perform driving.

Figure 2:
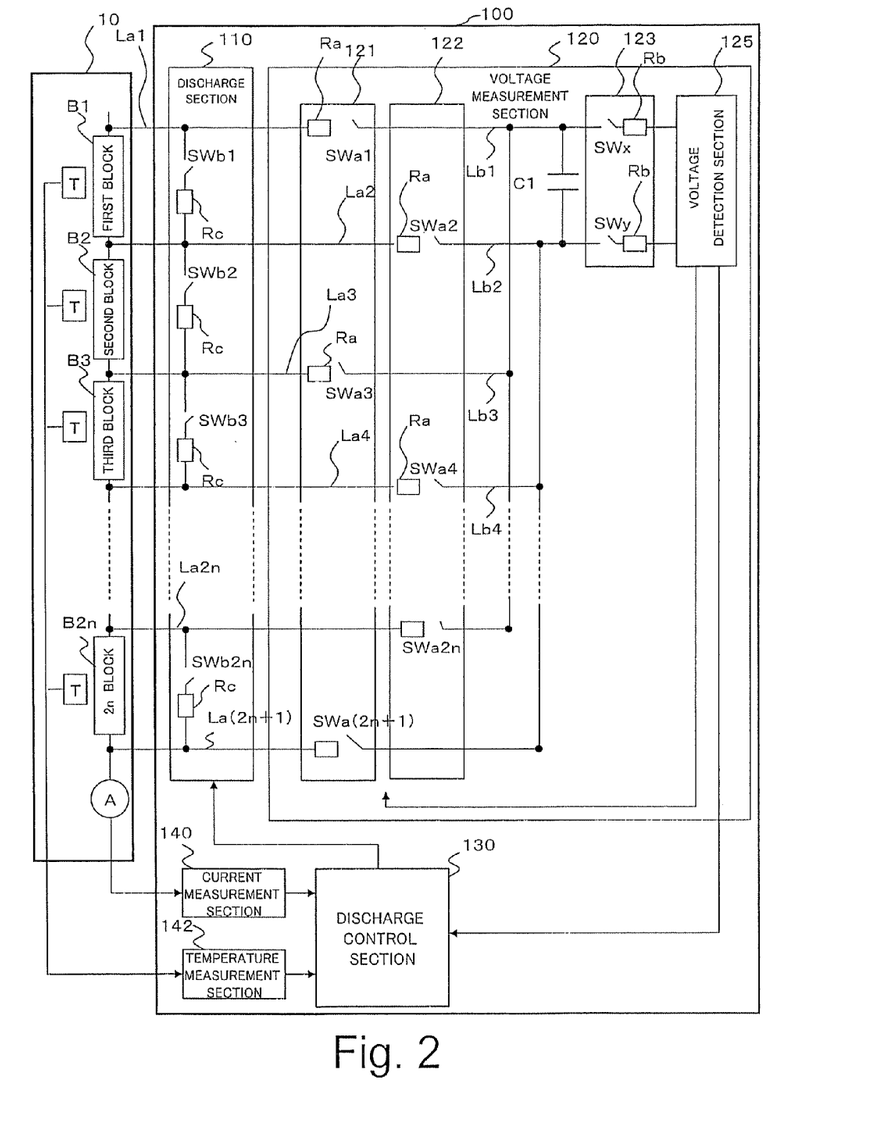
FIG. 2 is a view showing a capacitance equalization section of a functional block provided in a battery ECU.

FIG. 2 is a view chiefly showing, among functional blocks provided in the battery ECU 20, the capacitance equalization section 100 which measures terminal voltages of respective battery blocks and which equalizes the capacitance of battery block in accordance with the thus-measured respective terminal voltages.

In FIG. 2, the secondary battery 10 is formed by connecting $2n$ battery blocks in series. Each of the battery blocks is formed by electrically connecting two battery modules in series. Further, each of the battery modules is formed by electrically connecting six cells in series. A nickel-metalhydride battery, a lithium ion battery, and the like, can be used as the cell. No specific limitations are imposed on the number of battery blocks, the number of battery modules, and the number of cells. Moreover, the configuration of the secondary battery is also not limited to the example set forth.

The capacitance equalization section 100 has a discharge section 110, a voltage measurement section 120, a discharge control section 130, a current measurement section 140, and a temperature measurement section 142. The capacitance equalization section 100 controls electric discharge on a per-battery-block basis and can be said to act as a discharge controller.

The voltage measurement section 120 sequentially measures terminal voltages Vb of respective battery blocks B at a predetermined period of measurement (per; e.g., 5 msec.), and sequentially outputs to the discharge control section 130 voltage data showing each terminal voltage Vb. The current measurement section 140 measures the charge/discharge current I of the secondary battery 10 detected by a current sensor A and outputs current data showing the charge/discharge current I to the discharge control section 130. In addition, the temperature measurement section 142 measures the battery temperatures Tb of the respective battery blocks B detected by respective temperature sensors T and outputs temperature data showing the respective battery temperatures Tb to the discharge control section 130.

The discharge control section 130 computes electromotive force Eb of each battery block B in accordance with sequentially-input voltage data, current data, and temperature data pertaining to the each battery block B. Further, the discharge control section 130 computes an amount of variations in each electromotive force Eb at a predetermined period of determination (per; for example, 100 msec.). When the thus-computed amount of variations is greater than a reference amount of variations $\Delta Ke$, the discharge control section commands the discharge section 110 to perform discharging of a battery block exhibiting the greatest electromotive force. After a predetermined period has passed since the discharge command was issued, the discharge control section 130 commands stoppage of electric discharge. When the amount of variations is greater than the reference amount of variations $\Delta Ke$, the discharge control section 130 may also command a plurality of higher-level battery blocks exhibiting great electromotive force to perform electric discharge in addition to commanding the battery block exhibiting the greatest electromotive force.

The discharge section 110 has for each battery block a resistor Rc which is to serve as a discharge element. Switches SWb are connected in series with the respective resistors Rc. In accordance with a discharge command from the discharge control section 130, the discharge section 110 turns on a switch Swb assigned to the commanded battery block B, to thus cause the battery block B to electrically discharge. Thus, processing for equalizing capacity of the battery blocks is performed. When received a discharge stop command from the discharge control section 130, the discharge section 110 turns off the switch SWb assigned to a battery block being electrically discharged. In a case where there is a battery block B which is electrically discharging in accordance with the previous command when a new discharge command is received, the discharge section 110 turns off the switch SWb assigned to the battery block B being discharged and turns on the switch Swb conforming to a new discharge command.

The voltage measurement section 120 detects electrical capacitance accumulated in a capacitor C1, thereby measuring a terminal voltage of each battery block.

As shown in FIG. 2, potential detection lines La1 through La($2n$+1) are connected one by one to respective terminals of the battery blocks B1 through B$2n$.

A first multiplexer 121 has (n+1) switches SWa1, SWa3, ..., SWa($2n$+1). Among potential detection lines La1 through La ($2n$+1), odd-numbered potential detection lines La1, La3, ..., La ($2n$+1) from one end of the battery block are connected to single ends of the respective switches SWa1, SWa3, ..., SWa($2n$+1) by way of the resistors Ra.

In the meantime, a second multiplexer 122 has "n" switches SWa2, SWa4, ..., and SWa$2n$. Even-numbered potential detection lines La2, La4, ..., and La$2n$ are connected to single ends of the switches SWa2, SWa4, ..., and SWa$2n$ by way of the resistors Ra.

Single ends of the potential detection lines Lb1, Lb3, ..., and Lb($2n$+1) are connected to the other ends of the switches SWa1, SWa3, ..., and SWa($2n$+1) of the first multiplexer 121, and the other ends of the respective potential detection lines Lb1, Lb3, ..., Lb($2n$+1) are commonly connected to one end of the capacitor C1 (corresponding to a first potential detection terminal).

In the meantime, single ends of the respective potential detection lines Lb2, Lb4, ..., and Lb$2n$ are connected to the other ends of the switches SWa2, SWa4, ..., and SWa$2n$ of the second multiplexer 122, and the other ends of the respective potential detection lines Lb2, Lb4, ..., and Lb$2n$ are commonly connected to the other end of the capacitor C1 (corresponding to a second potential detection terminal).

The capacitor C1 is connected to a voltage detection section 125 by way of a sample switch 123. More specifically, one end of the capacitor C1 is connected to one end of a switch SWx provided in the sample switch 123, and the other end of the switch SWx is connected to the voltage detection section 125 by way of resistors Rb. In the meantime, the other end of the capacitor C1 is connected to one end of a switch SWy provided in the sample switch 123, and the other end of the switch SWy is connected to the voltage detection section 125 by way of the resistors Rb.

The voltage detection section 125 controls activation and deactivation of the respective switches SW provided in the first and second multiplexers and the sample switch so that the terminal voltage Vb can be measured on per-block basis in sequence from the battery block B1.

Figure 3:
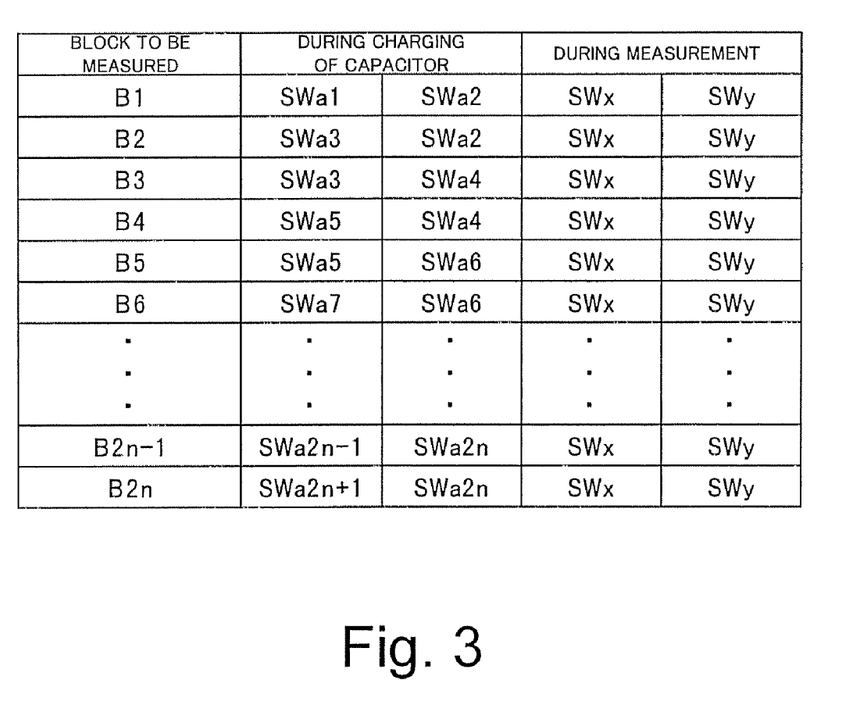
FIG. 3 is a view showing an example switch control map to which a voltage detection section makes a reference.

FIG. 3 is a switch control map to which the voltage detection section 125 makes a reference. As shown in FIG. 3, the battery block B1 is selected by means of closing; for example, the switches SWa1 and SWa2 for a predetermined period of time, whereupon the capacitor C1 is charged at a terminal voltage Vb1 of the battery block B1. Next, the switches SWa1 and SWa2 are opened, and the switches SWx and SWy are closed for a predetermined period of time, whereby the charging voltage of the capacitor C1; namely, the terminal voltage Vb1 of the battery block B1, is input to the voltage detection section 125. The voltage detection section 125 measures the terminal voltage Vb1 and outputs voltage data showing the terminal voltage Vb1 to the discharge control section 130. Subsequently, the switches SWx and SWy are opened, and the switches SWa3 and SWa2 are closed for a predetermined period of time, whereupon the battery block B2 is selected and the capacitor C1 is charged at a terminal voltage Vb2 of the battery block B2. Subsequently, the switches SWa3 and SWa2 are opened, and the switches SWx and SWy are closed for a predetermined period of time, whereby the charging voltage of the capacitor C1; namely, the terminal voltage Vb2 of the battery block B2, is input to the voltage detection section 125. In the voltage detection section 125, the polarity of the terminal voltage Vb2 is inverted with respect to the polarity of the terminal voltage vb1, and hence the polarity of the input terminal voltage Vb2 is inverted, and voltage data showing the terminal voltage Vb2 are output to the discharge control section 130.

Likewise, activation or deactivation of the switch SW is controlled by reference to the switch control map shown in FIG. 3, whereby a terminal voltage can be measured on a per-battery-block basis.

In the capacitance equalization section 100 configured as mentioned above, measurement of the terminal voltages Vb of the respective battery blocks B in the voltage measurement section 120 and capacitance equalization processing of the discharge section 110 are performed in parallel with each other at different periods. Therefore, depending on a timing, there is a potential of a terminal voltage of the battery block B that is in the middle of electric discharge being subjected to measurement of a terminal voltage. However, measurement of a terminal voltage performed in the middle of electric discharge results in a resistor Rc and a capacitor C1 being connected in parallel to both ends of the battery block B. Under influence of the resistor Rc, an error arises in the terminal voltage Vb to be measured. When capacitive variations in the battery blocks are determined by means of such an error, an attempt to appropriately equalize capacitance of battery blocks may end in a failure.

Accordingly, in the present embodiment, when a battery block to be measured is in the middle of electric discharge, the discharge control section 130 commands the discharge section 110 to stop electric discharge of the battery block according to a timing when the voltage measurement section 120 measures the terminal voltage of the battery block B. There is a potential of the voltage measurement section 120 commencing measurement before stoppage of electric discharge. Therefore, when a battery block Bm−1 which is one block before a battery block Bm in the middle of electric discharge is subjected to measurement, the discharge control section 130 may also command the discharge section 110 to stop electric discharge. During a period of time when measurement of the next battery block Bm+1 is being performed after completion of measurement of the terminal voltage of the battery block Bm stopped electric discharge, the discharge control section 130 resumes electric discharge of the battery block Bm.

As mentioned above, the terminal voltage of the battery block can be measured more accurately by means of performing control operation in such a way that electric discharge of the battery block to be measured is not performed during a period of time when the voltage measurement section 120 measures the terminal voltage. Accordingly, capacitance equalization processing based on a terminal voltage can be performed more accurately.

Figure 4:
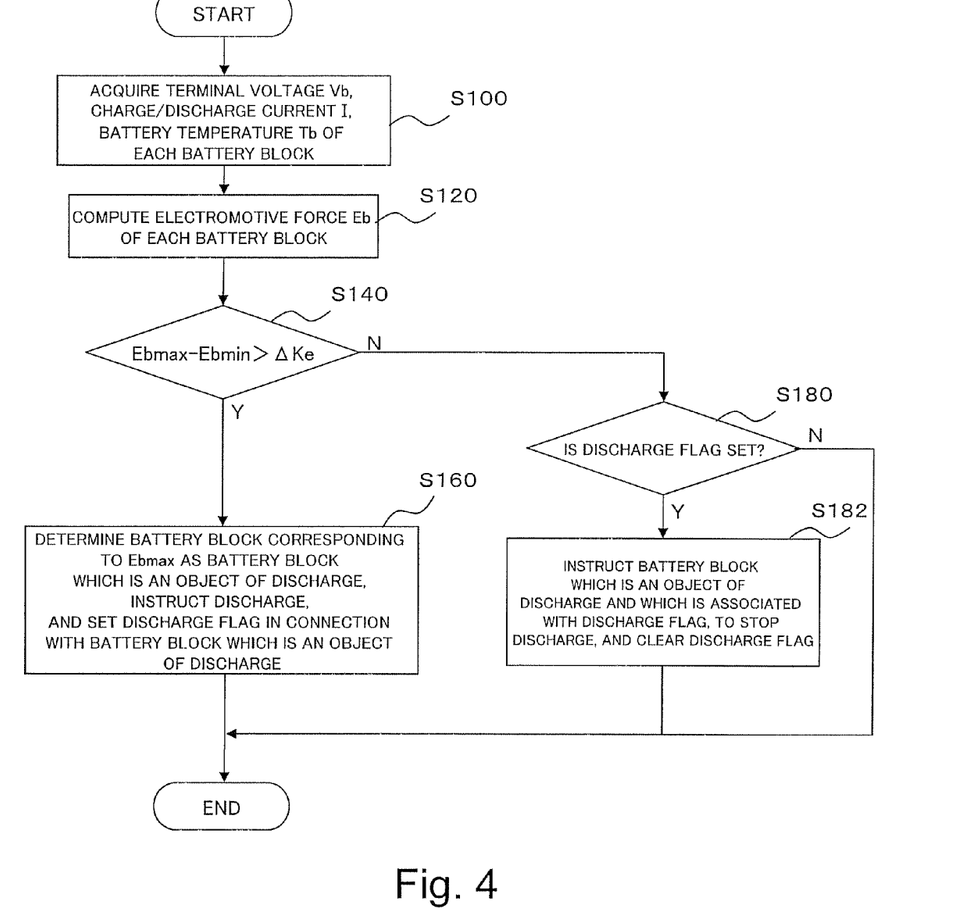
FIG. 4 is a flowchart showing procedures of capacitance equalization processing performed by a discharge control section.

FIG. 4 is a flowchart showing procedures of capacitance equalization processing performed by the discharge control section 130. The discharge control section 130 repeats procedures at an interval of; for example, 100 msec.

In FIG. 4, the discharge control section 130 acquires a terminal voltage Vb, a battery temperature Tb, and a charge/discharge current I of each battery block B input from each section (S100), and computes electromotive force Eb of each battery block B in accordance with them (S120).

The essential requirement for the discharge control section 130 is to compute electromotive force Eb by means of a well-known technique. For instance, the discharge control section 130 acquires a plurality of sets of paired data, each set consisting of the terminal voltage Vb and the charge/discharge current I, and stores the thus-acquired sets of paired data. The discharge control section determines a first-order approximate line (a voltage V-current I approximate line) from the sets of paired data by means of regression analysis, and also determines a V intercept of the V-I approximate line as a non-load voltage Vbo. An integrated value ∫I of the charge/discharge current I is computed. A polarity voltage Vp of the battery is determined from a function of the battery temperature Tb, the non-load voltage Vbo, and the current integrated value ∫I. The polarity voltage Vp is subtracted from the non-load voltage Vbo, thereby determining the electromotive force Eb of the battery block B.

After computing the electromotive force Eb of each of the battery blocks B, the discharge control section 130 computes the amount of variations in electromotive force of the respective battery blocks and determines whether or not the thus-computed amount of variations is greater than the predetermined reference amount of variations. More specifically, the discharge control section 130 extracts the minimum electromotive force Ebmin and the maximum electromotive force Ebmax from the electromotive forces Eb; determines a difference between the minimum electromotive force Ebmin and the maximum electromotive force Ebmax; and determines whether or not the difference is greater than the predetermined reference amount of variations ΔKe (S140).

When a result of determination shows that the amount of variations in electromotive force of the battery blocks is greater than the reference amount of variations (an affirmative determination result "Y" rendered in step S140), the discharge control section 130 determines the battery block B corresponding to the maximum electromotive force Ebmax as a battery block which is an object of electric discharge, and commands the discharge section 110 to cause the battery block to electrically discharge. At this time, the discharge control section 130 sets a predetermined discharge flag, and also stores an identification number of the battery block B that is an object of electric discharge, in association with the flag (S160).

In the meantime, when the amount of variations in electromotive force of the battery blocks is equal to or smaller than the reference amount (a negative determination result "N" rendered in step S140), a determination is made as to whether or not the discharge flag is set (S180). When the discharge flag is set (an affirmative determination result "Y" rendered in step S180), the discharge control section 130 commands the discharge section 110 to stop electric discharge of the battery block B associated with the discharge flag, and clears the discharge flag (S182). When the discharge flag is cleared (a negative determination result "N" rendered in step S180), the discharge control section 130 completes capacitance equalization processing.

Subsequently, by reference to a flowchart shown in FIG. 5, there will now be described procedures along which the discharge control section 130 controls electric discharge of the battery block B in such a way that the battery block B which is an object of measurement is not electrically discharged during a period of time when the voltage measurement section 120 is measuring the terminal voltage.

Figure 5:
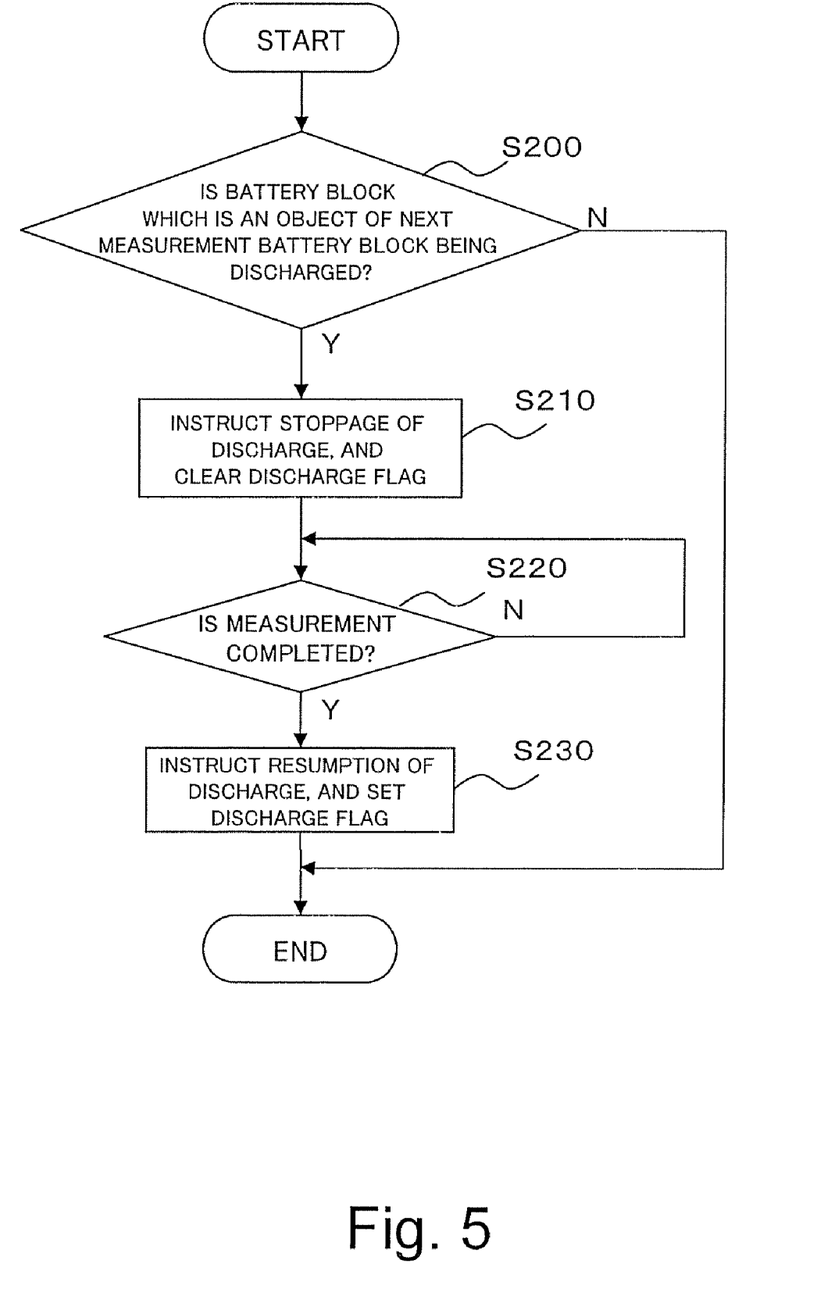
FIG. 5 is a flowchart showing procedures of discharge control of a battery block B performed by a discharge control section according to a state of measurement of a terminal voltage.

The discharge control section 130 performs; for example, procedures shown in FIG. 5 at the same period (e.g., every 5 msec.) that at which the voltage measurement section 120 measures a voltage of the battery block.

First, the discharge control section 130 determines whether or not a battery block which is the next object of measurement is a battery block being electrically discharged (S200).

For instance, the discharge control section 130 sequentially receives, from the voltage measurement section 120, an input of an identification number of a battery block which is the next object of measurement. The discharge control section 130 subsequently ascertains activation or deactivation of the battery block by reference to the discharge flag. When the battery block is activated, the identification number associated with the discharge flag is checked against the identification number input from the discharge control section 130. When a check result shows a match, the discharge control section 130 determines the block that is the next object of measurement as a battery block being electrically discharged.

Alternatively, the discharge control section 130 acquires from the voltage measurement section 120 an input of measurement schedule information including information about a sequence of measurement and a measurement period before initiation of measurement, and stores the thus-acquired input. When the voltage measurement section 120 commences measurement, the discharge control section 130 sequentially makes the determination in accordance with the measurement schedule.

When a determination result shows that the battery block which is the next object of measurement is a battery block being electrically discharged (an affirmative determination result "Y" rendered in step S200), the discharge control section 130 commands the discharge section 110 to stop electric discharge of the battery block being electrically discharged, and clears the discharge flag (S210). Subsequently, when measurement of the voltage of the battery block is completed (an affirmative determination result "Y" rendered in step S220), the discharge control section 130 commands the discharge section 110 to again start electric discharge of the battery block, and sets the discharge flag (230). Upon receipt of an acknowledgement of completion of measurement from the voltage measurement section 120, the discharge control section 130 detects completion of measurement of the voltage of the battery block. Alternatively, the discharge control section 130 determines that measurement of the voltage of the battery block is determined to be completed in accordance with the measurement schedule information at a point in time when a period of time equivalent to one period elapses.

As mentioned above, when the battery block which is an object of measurement is electrically discharging, the discharge control section 130 commands the discharge section 110 to stop electric discharge of the battery block in accordance with a timing when the voltage measurement section 120 measures a terminal voltage of the battery block B. As a result, the terminal voltage of the battery block B can be measured more accurately. Consequently, processing for equalizing capacity of battery blocks performed by the discharge control section 130 can also be performed accurately in accordance with the measurement result.

Incidentally, the terminal voltage of the battery block B changes according to a battery temperature, as well. Accordingly, when variations exist in the battery temperature of the battery blocks, terminal voltages measured by the voltage measurement section 120 are also affected. Specifically, depending on the amount of variations in battery temperature, it is better not to ignore an error in the amount of variations in electromotive force.

Therefore, when the amount of variations in battery temperature is large, the discharge control section 130 may also determine the amount of variations in electromotive force in each battery block B after making a correction to electromotive force according to the battery temperature.

Figure 6:
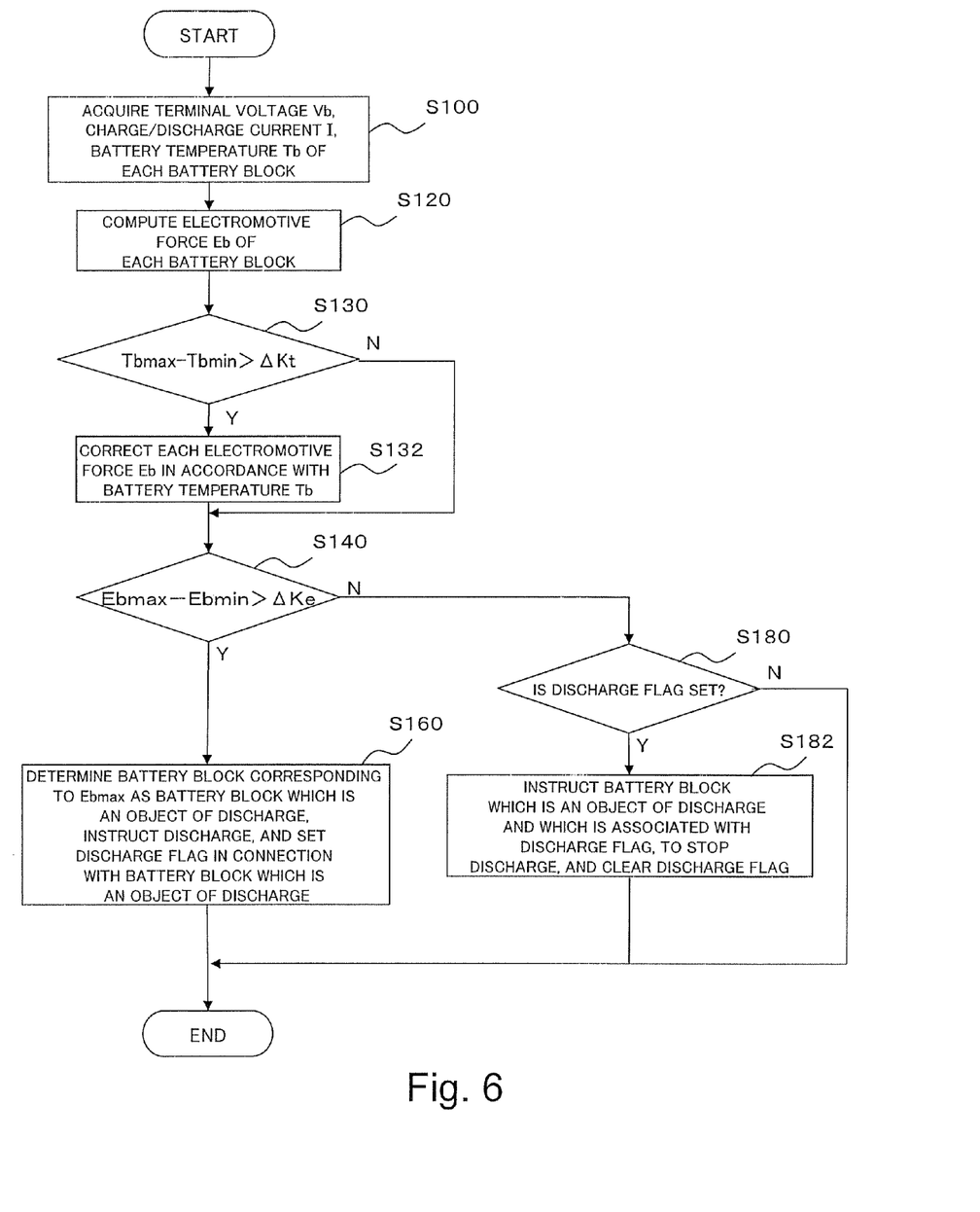
FIG. 6 is a flowchart showing processing procedures of the discharge control section performed when the amount of variation in battery temperature is determined before determination of the amount of variation in electromotive force.

FIG. 6 is a flowchart showing processing procedures of the discharge control section 130 performed when an amount of variations in battery temperature is determined before determination of an amount of variations in electromotive force. In FIG. 6, procedures which are the same as those shown in FIG. 4 are assigned the same reference numerals, and their repeated explanations are omitted.

After computing the electromotive force Eb of each battery block (S120), the discharge control section 130 determines whether or not variations exist in the battery temperature Tb of each battery block B (S130). More specifically, the discharge control section 130 extracts the minimum battery temperature Tbmin and the maximum battery temperature Tbmax from the battery temperature Tb of each battery block B, and computes a difference between the minimum battery temperature and the maximum battery temperature (=Tbmax−Tbmin). According to whether or not the difference is greater than a predetermined reference amount of temperature variations ΔKt, the discharge control section 130 determines whether or not variations exist in the battery temperature Tb.

Figure 7:
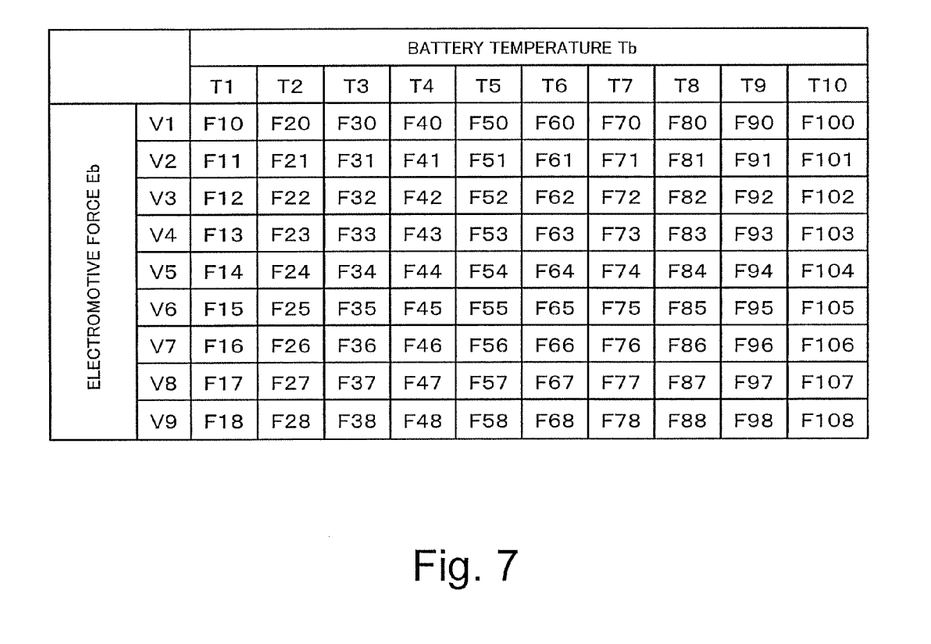
FIG. 7 is a view showing an example of a reference map defining correction coefficients for electromotive force according to battery temperatures.

When a result of determination shows that variations exist in battery temperature Tb (an affirmative determination result "Y" rendered in step S130), the discharge control section 130 makes a correction to each electromotive force Eb in accordance with each battery temperature Tb (S132). For instance, in accordance with a reference table, such as that shown in FIG. 7, the discharge control section 130 specifies a correction coefficient F for each electromotive force Eb and multiplies the electromotive force Eb by the specified correction coefficient F, thereby making a correction.

As mentioned above, when the amount of variations in battery temperature is great, a correction is made to electromotive force according to a battery temperature for each battery block B, whereby processing for equalizing capacity of the battery blocks can be performed more accurately.

What is claimed is:

1. A device for equalizing capacity of a secondary battery comprising:
   a voltage measurement section for periodically measuring a terminal voltage of each battery block by way of potential detection lines electrically connected to both terminals of the respective battery blocks constituting the secondary battery,
   a discharge section for effecting discharge in each of the battery blocks by electrically connecting both terminals of a discharge element to both terminals of the respective battery blocks by way of the respective potential detection lines, and
   a discharge control section which, in parallel with measurement of the respective terminal voltages performed by the voltage measurement section, periodically computes an amount of variations in electromotive force of battery blocks in accordance with respective terminal voltages measured by the voltage measurement section; which commands the discharge section to effect discharge of at least a battery block exhibiting highest electromotive force when the amount of variations exceed a first reference amount; and which commands the discharge section to stop discharge of the battery block being discharged before measurement is performed when the voltage measurement section measures a terminal voltage of the battery block being discharged by the discharge section.

2. The device according to claim 1, further comprising:
   a current measurement section for measuring a charge/discharge current of the secondary battery; and
   a temperature measurement section for measuring battery temperatures of the respective battery blocks, wherein the discharge control section
       computes electromotive force of the respective battery blocks in accordance with at least the respective measured terminal voltages and the charge/discharge current, and
       computes an amount of temperature variations in the battery blocks in accordance with the measured battery temperatures, makes a correction to the computed electromotive force of the respective battery blocks in accordance with the battery temperatures of the respective battery blocks when the amount of variations exceed a second reference amount, and computes an amount of variations in electromotive force of the battery blocks in accordance with corrected electromotive force.

3. The device according to claim 1, wherein the discharge control section resumes discharge of the battery block after measurement of the terminal voltage.

* * * * *

UNITED STATES PATENT AND TRADEMARK OFFICE
CERTIFICATE OF CORRECTION

| | | |
|---|---|---|
| PATENT NO. | : 7,965,060 B2 | |
| APPLICATION NO. | : 11/969820 | |
| DATED | : June 21, 2011 | |
| INVENTOR(S) | : N. Yamabe | |

It is certified that error appears in the above-identified patent and that said Letters Patent is hereby corrected as shown below:

| COLUMN | LINE | ERROR |
|---|---|---|
| 10 | 60 | "with corrected" should read |
| (Claim 2, | line 18) | --with the corrected-- |

Signed and Sealed this
Eleventh Day of October, 2011

David J. Kappos
*Director of the United States Patent and Trademark Office*